(12) United States Patent
Alexander et al.

(10) Patent No.: US 9,937,537 B2
(45) Date of Patent: Apr. 10, 2018

(54) GROUNDWATER REMEDIATION SYSTEMS, DEVICES, AND METHODS

(71) Applicant: Ai-Remedial Systems, LLC, Chapel Hill, NC (US)

(72) Inventors: W. Joseph Alexander, Chapel Hill, NC (US); Gregory W. Lucier, Chapel Hill, NC (US)

(73) Assignee: AI-Remedial Sustems, LLC, Chapel Hill, NC (US)

( * ) Notice: Subject to any disclaimer, the term of this patent is extended or adjusted under 35 U.S.C. 154(b) by 0 days.

(21) Appl. No.: 15/582,760

(22) Filed: Apr. 30, 2017

(65) Prior Publication Data

US 2017/0232488 A1    Aug. 17, 2017

Related U.S. Application Data

(63) Continuation of application No. PCT/US2016/027878, filed on Apr. 15, 2016.

(60) Provisional application No. 62/147,970, filed on Apr. 15, 2015.

(51) Int. Cl.
| | | |
|---|---|---|
| *B09C 1/00* | (2006.01) | |
| *C02F 1/28* | (2006.01) | |
| *E03B 3/18* | (2006.01) | |
| *C02F 103/06* | (2006.01) | |

(52) U.S. Cl.
CPC ............. *B09C 1/002* (2013.01); *C02F 1/28* (2013.01); *E03B 3/18* (2013.01); *C02F 2103/06* (2013.01)

(58) Field of Classification Search
CPC ............. C02F 1/685; C02F 2209/005; C02F 2103/06; C02F 1/70; C02F 1/72; B01F 5/043; B01F 5/0496; B01F 3/0865; B01F 2015/0221; B09C 1/08; B09C 2101/00; B09C 2101/801
See application file for complete search history.

(56) References Cited

U.S. PATENT DOCUMENTS

| | | | |
|---|---|---|---|
| 4,863,312 | A | 9/1989 | Cavalli |
| 4,934,865 | A | 6/1990 | Varkonyi et al. |
| 5,354,149 | A | 10/1994 | Breaux |

(Continued)

FOREIGN PATENT DOCUMENTS

| | | |
|---|---|---|
| DE | 19715038 A1 | 11/1998 |
| DE | 19948828 C2 | 6/2003 |

(Continued)

*Primary Examiner* — Krishnan S Menon
*Assistant Examiner* — Waqaas Ali
(74) *Attorney, Agent, or Firm* — NK Patent Law, PLLC

(57) ABSTRACT

A liquid treatment system includes: a filter casing including a structural wall, a first screen formed though the structural wall, and a second screen formed though the structural wall; and a liquid treatment cartridge configured for placement in the filter casing between the first and second screens. The liquid treatment cartridge includes a cartridge casing having an upper end and a lower end, and an inflatable seal surrounding the cartridge casing at an intermediary position between the upper end and lower end. A method of servicing a groundwater treatment installation includes: vertically displacing a liquid treatment cartridge within a filter casing having a structural wall, a first screen formed though the structural wall, and a second screen formed though the structural wall.

17 Claims, 12 Drawing Sheets

(56) References Cited

U.S. PATENT DOCUMENTS

| | | | |
|---|---|---|---|
| 5,487,622 A * | 1/1996 | Cherry | B09C 1/002 |
| | | | 210/170.07 |
| 5,577,558 A * | 11/1996 | Abdul | B09C 1/002 |
| | | | 166/106 |
| 5,624,552 A | 4/1997 | Vales et al. | |
| 5,730,550 A | 3/1998 | Andersland et al. | |
| 5,741,427 A | 4/1998 | Watts et al. | |
| 5,813,798 A | 9/1998 | Whiffen | |
| 6,224,770 B1 | 5/2001 | Savage et al. | |
| 6,458,271 B1 | 10/2002 | Naftz et al. | |
| 7,153,061 B2 * | 12/2006 | Nickelson | B09B 1/00 |
| | | | 405/128.65 |
| 7,156,581 B2 | 1/2007 | Zomer et al. | |
| 7,347,647 B2 | 3/2008 | Seech et al. | |
| RE40,448 E | 8/2008 | Borden et al. | |
| 7,497,948 B2 | 3/2009 | Chowdhury et al. | |
| 8,596,351 B2 | 12/2013 | Divine et al. | |
| 2014/0003870 A1 | 1/2014 | Wendt | |
| 2015/0321927 A1 | 11/2015 | McWayne et al. | |
| 2016/0115666 A1 * | 4/2016 | Hargrave | E02D 5/14 |
| | | | 405/274 |

FOREIGN PATENT DOCUMENTS

| | | | |
|---|---|---|---|
| DE | 19715038 B4 | | 3/2005 |
| JP | 7096289 A | * | 4/1995 |
| JP | 2000210655 A | * | 8/2000 |
| JP | 2001131955 A | * | 5/2001 |
| JP | 2004195320 A | * | 7/2004 |
| JP | 2005296762 | | 10/2005 |

\* cited by examiner

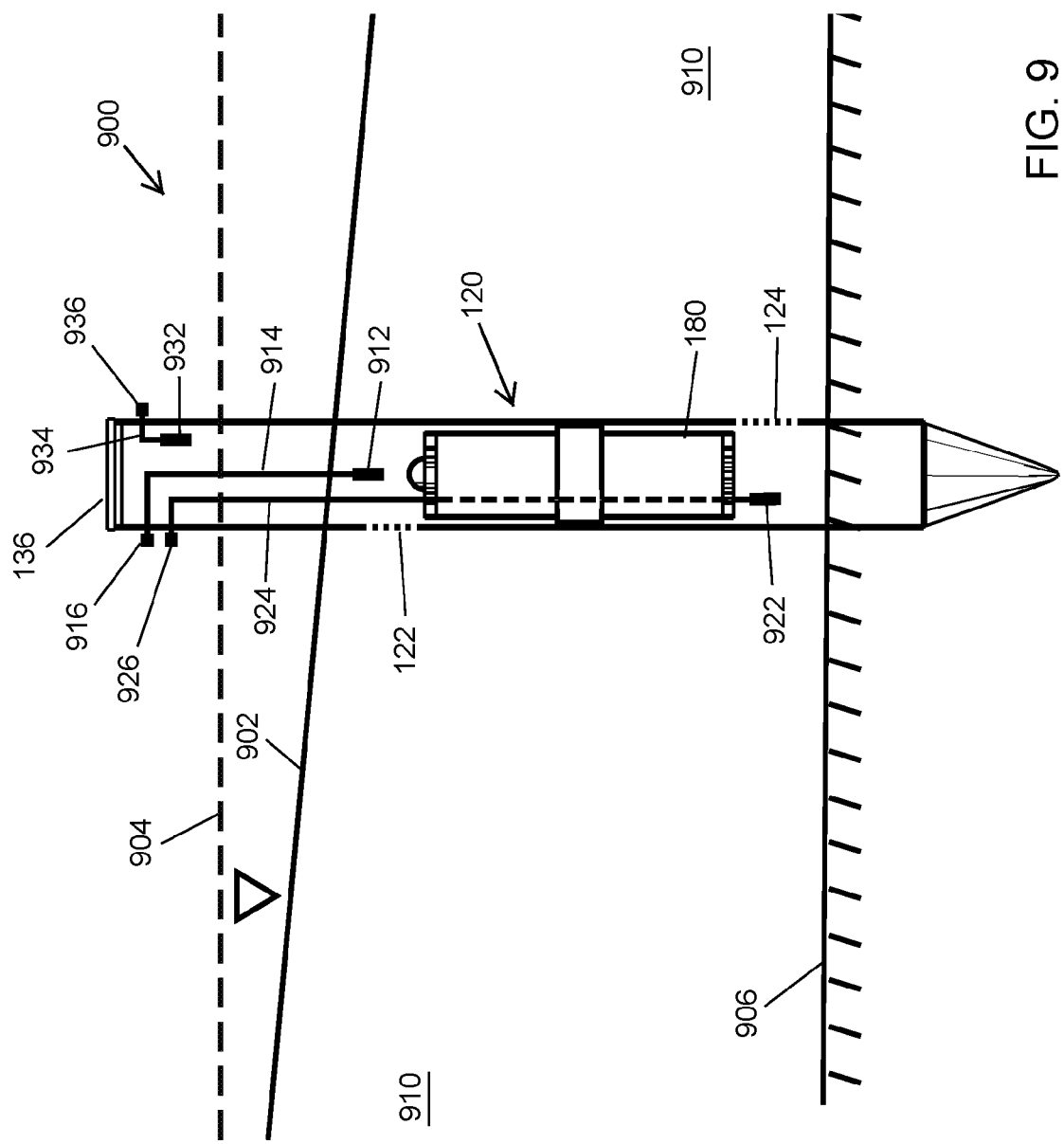

GROUNDWATER REMEDIATION SYSTEMS, DEVICES, AND METHODS

CROSS-REFERENCE TO RELATED APPLICATION

This application is a continuation of PCT patent application no. PCT/US16/27878, titled "GROUNDWATER REMEDIATION SYSTEMS, DEVICES, AND METHODS", filed on Apr. 15, 2016, which claims the benefit of priority of U.S. provisional patent application No. 61/147,970, titled "Subsurface Groundwater Remediation System," filed on Apr. 15, 2015, which is incorporated herein in its entirety by this reference.

TECHNICAL FIELD

The present disclosure relates to groundwater remediation. More particularly, the present disclosure relates to versatile systems, devices, and methods for site-specific remediation and sampling.

BACKGROUND

Among current remedial options, the permeable reactive barrier (PRB) market segment is evolving and gaining popularity as a promising technology in terms of cost and stability of performance.

Several problems are prevalent with conventional PRB systems. Typically there is no ability to exchange permeable reactive materials (PRMs) emplaced in subsurface trenches should laboratory treatability tests and remedial planning efforts fail to accurately predict the geochemical reactions that occur in the subsurface environment, resulting in a reduction in the system's longevity. Also, disposing of large excavated volumes of contaminated material from trenches required for the installation of conventional PRB systems is not well addressed. Another problem is the restricted placement of conventional PRB systems at distal portions of plumes due to limitations on ability to effectively treat contaminant mass flux. Finally, there is typically an inability to rehabilitate areas where mineral precipitation may occur within the PRMs or adjacent formations. These problems affect remediation contractors because conventional PRB remedial systems may not last as long as predicted and may require injections, or in the worst case, expensive re-excavation, which can involve remobilization of construction equipment and handling and disposal of hazardous waste generated from the re-excavation and the PRB re-emplacement processes.

A technically viable and cost-effective solution is therefore needed due to current PRB design, performance, and longevity concerns. Improvements are needed in PRB construction methods and installations to increase performance and allow flexibility in treating multiple and mixed groundwater contaminants.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a liquid treatment system includes: a filter casing including a structural wall, a first screen formed though the structural wall, and a second screen formed though the structural wall; and a liquid treatment cartridge configured for placement in the structural wall of the filter casing between the first screen and the second screen, the liquid treatment cartridge including a cartridge casing having an upper end and a lower end, and an inflatable seal surrounding the cartridge casing at an intermediary position along the cartridge casing between the upper end and lower end.

In at least one example, when the liquid treatment cartridge is placed in the filter casing, an annular space is defined between an exterior of the cartridge casing and an interior of the structural wall of the filter casing.

In at least one example, the inflatable seal has an inflated condition in which an annular space is filled by the inflatable seal such that the liquid treatment cartridge is engaged with the interior of the structural wall of the filter casing.

In at least one example, the inflatable seal has a deflated condition in which the liquid treatment cartridge is disengaged from the interior of the structural wall of the filter casing permitting the liquid treatment cartridge to be placed within and removed from the structural wall of the filter casing.

In at least one example, engagement elements are connected to an exterior of the structural wall.

In at least one example, the engagement elements include a first connector having a channel and a second connector having a ridge with a widened end.

In at least one example, at least a first wall section is engaged with the first connector and a second wall section is engaged with the second connector such that the filter casing, first wall section, and second wall section define a barrier wall.

In at least one example, the engagement elements comprise fins jutting radially outward from the structural wall.

In at least one example, the filter casing is installed in a ground area with the first screen and second screen positioned below a ground level of the ground area.

In at least one example: the ground area has a water table upgradient direction and a water table downgradient direction; the first screen faces the upgradient direction; and the second screen faces the downgradient direction.

In at least one embodiment, a liquid treatment cartridge includes: a cartridge casing having an upper end and a lower end; a perforated cap having an outer periphery connected to the upper end of the cartridge casing; and a perforated bottom plate having an outer periphery connected to the lower end of the filter casing; wherein the cartridge casing has an interior between the perforated cap and perforated bottom plate for containing at least one permeable reactive material.

In at least one example, the cartridge casing is shaped as a circular cylinder.

In at least one example, a loop is connected to the perforated cap for lifting the cartridge casing.

In at least one example, an inflatable seal surrounds the cartridge casing at an intermediary position along the cartridge casing between the upper end and lower end.

In at least one example, a fill tube extends from the inflatable seal for inflating and deflating the inflatable seal using a gas or liquid.

In at least one embodiment, a method of servicing a groundwater treatment installation includes: vertically displacing a liquid treatment cartridge within a filter casing, the filter casing including a structural wall, a first screen formed though the structural wall, and a second screen formed through the structural wall, the liquid treatment cartridge including a cartridge casing having an upper end and a lower end, and an inflatable seal surrounding the cartridge casing at an intermediary position along the cartridge casing between the upper end and lower end.

In at least one example, vertically displacing the liquid treatment cartridge within the filter casing comprises vertically displacing the liquid treatment cartridge within the filter casing when the inflatable seal is in a deflated condition in which the liquid treatment cartridge is disengaged from an interior of the structural wall of the filter casing.

In at least one example, vertically displacing the liquid treatment cartridge within the filter casing comprises lifting the liquid treatment cartridge from the filter casing after a period of time in which groundwater flowed through the liquid treatment cartridge.

In at least one example, vertically displacing the liquid treatment cartridge within the filter casing comprises lowering the liquid treatment cartridge into the filter casing.

In at least one example, the method further includes inflating the inflatable seal into an inflated condition in which the liquid treatment cartridge is engaged with the interior of the structural wall of the filter casing.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 9 is a side elevational view showing the filter casing of FIG. 1 in an installation ground area similar to that of FIG. 5 and with several installed sampling accesses according to at least one embodiment.

DETAILED DESCRIPTIONS

Figure 1:
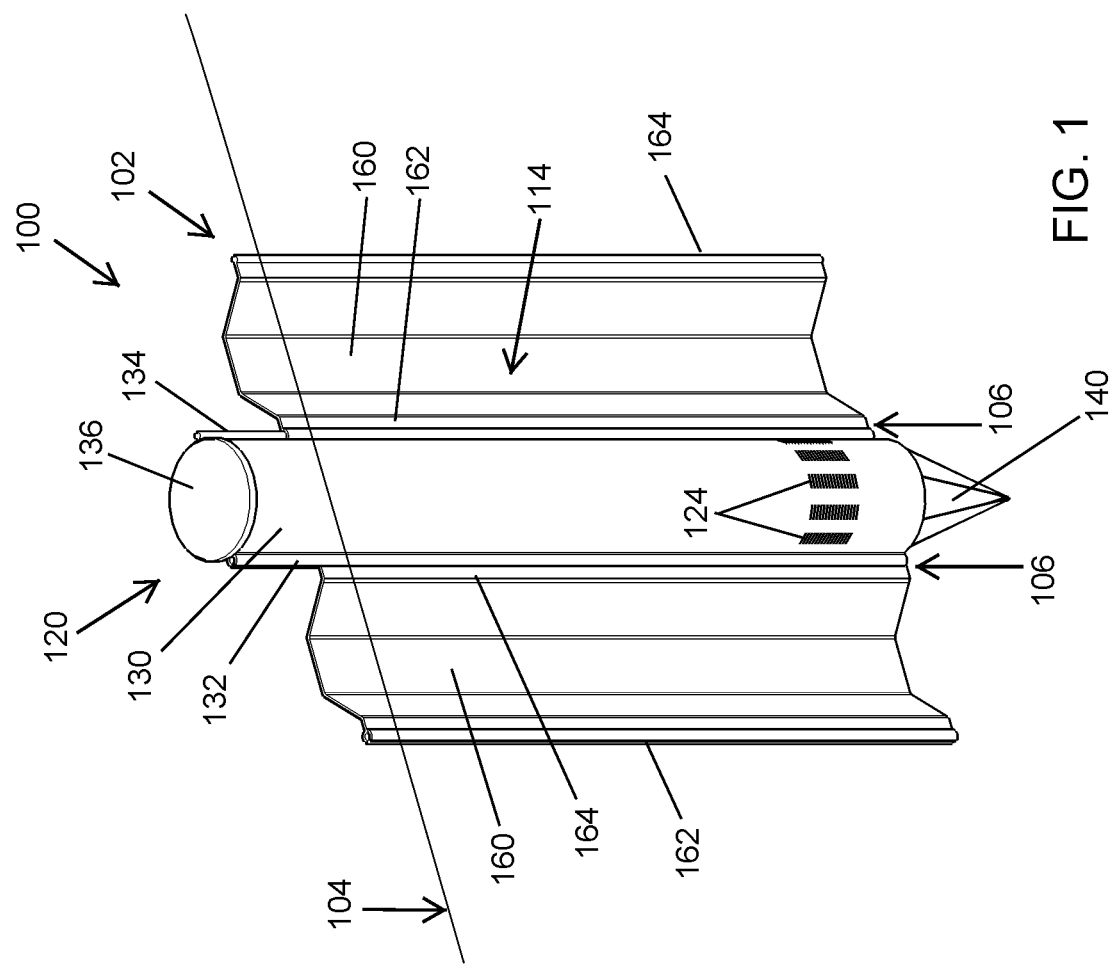
FIG. 1 is a remedial system in which a sectioned barrier wall includes a filter casing installed among multiple interlocking wall sections according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

These descriptions detail subsurface remedial systems, devices, and methods designed to treat multiple and mixed groundwater contaminants in a variety of hydrogeologic settings. In various embodiments, interlocking and customizable mechanical components are coupled with permeable reactive materials (PRMs) placed in replaceable filter cartridges to create a long-term, cost-effective, and energy efficient remedial system for contaminated groundwater. Advantages include a mechanical design that can be installed into the ground in the form of a funnel and gate configuration, the ability to exchange filter cartridges and safely collect gases to extend the system's performance and life expectancy compared to existing methods, and the optimally combined, compacted, and configured PRMs installed within the replaceable filter cartridges.

FIG. 1 is a remedial system 100 according to at least one embodiment. The system 100 includes a sectioned barrier wall 102 that includes multiple interlocking wall sections 160. In installation, the wall sections 160 are placed in a ground area in a partially or entirely subsurface condition with reference to the ground surface 104. A filter casing 120 is shown as interlocked along vertical connections 106 with two wall sections 160. The illustrated arrangement can be repeated or varied such that a barrier wall of any size can be constructed with wall sections 160 and any number of filter casings 120 placed along the barrier wall engaged with adjacent wall sections 160 or other filter casings 120.

The wall sections 160 and vertical connections 106 among them are essentially water impermeable. Groundwater migrates across the wall via the filter casing 120, moving vertically within the interior of the filter casing 120 in either upward or downward flow direction according to its installation and site-specific arrangement. At least one upper screen 122 (FIG. 5) and at least one lower screen 124 (FIG. 1) are formed through the structural wall 130 of the filter casing 120, permitting groundwater to pass between the interior of the filter casing 120 and ground areas neighboring the upper screen 122 and lower screen 124, either of which may serve as inlet to the interior as the other serves as outlet to adjacent aquifer. That is, in one installation the upper screen 122 may serve as an inlet for downward flow along the interior of the filter casing 120 as the lower screen 124 serves as an outlet. In another installation the lower screen 124 may serve as an inlet for upward flow along the interior of the filter casing 120 as the upper screen 122 serves as an outlet.

The illustrated arrangement of FIG. 1 may be particularly advantageous in an installation in which the first side 112 (FIG. 5) of the barrier wall 102 faces the upgradient direction (upstream) with respect to native groundwater migration in the installation ground area, whereas the second side 114 (FIGS. 1 and 5) of the barrier wall 102 faces the downgradient direction (downstream). In such an installation, the upper screen 122 serves as an inlet for downward flow (FIG. 5) along the interior of the filter casing 120 as the lower screen 124 serves as an outlet. Also, the filter casing 120 is placed in a downstream position interlocked with downstream ends of the adjacent wall sections 160 (FIG. 1), such that the wall sections 160 funnel downgradient direction migrating groundwater toward the filter casing 120 when arranged in a configuration such as that shown in FIG. 7.

Figure 2:
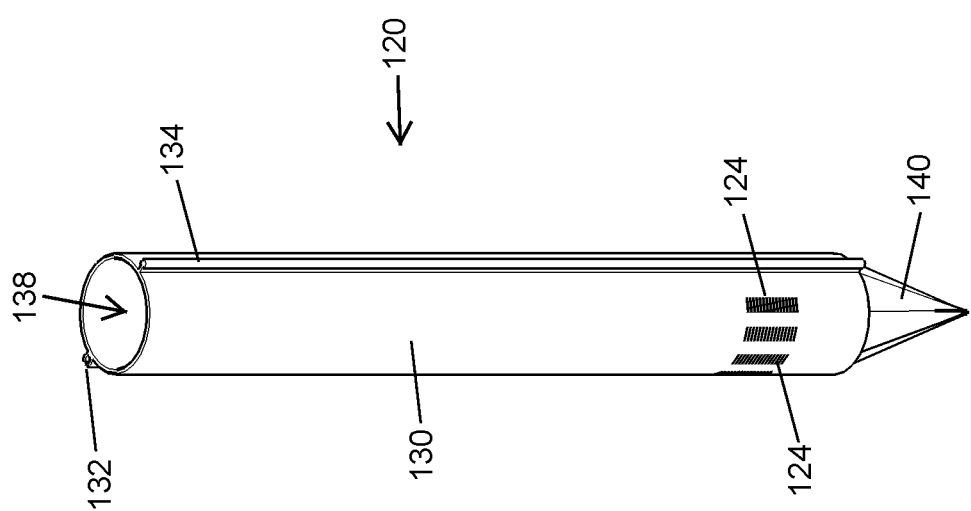
FIG. 2 is a perspective view of the filter casing of FIG. 1 showing its upper-end opening without a cover.

The structural wall 130 of the filter casing 120 in at least one embodiment is shaped as a circular cylinder as shown in FIGS. 1 and 2. Other shapes are within the scope of these descriptions. For example, in one embodiment, a structural wall of a filter casing is shaped as a hexagonal tube, with similarity to the half-hexagon form of the wall sections 160. In another embodiment, a structural wall of a filter casing is shaped as a rectangular shaft. The structural wall 130 generally has a generally uniform interior along its vertical length to permit vertical loading and unloading of a treatment cartridge within the interior and a generally uniform exterior form to facilitate its installation, which may involve vertical driving by force, but could also be installed in an open excavation below the ground surface. The upper and lower screens 122 and 124 may be formed as horizontal slots. In other embodiments they may be wedge shaped and/or have other geometries. "Upper" and "lower" are relative descriptive terms, denoting that the upper screen 122 is placed vertically higher than the lower screen 124 along the length of filter casing 120.

A cover 136 is engaged with the upper end of the structural wall 130 preventing unintended entry of debris and unauthorized access to the interior of the filter casing 120. A bottom assembly 140 is engaged with the lower end of the structural wall 130 and seals the interior of the filter casing 120 from below. In the illustrated embodiment, the bottom assembly 140 is shown as a tapered drive shoe shaped as a faceted cone for driving through earth when the filter casing 120 is to be installed by hammering or vibrating. In some installations however, the filter casing 120 is lowered into an open excavation without hammering or other driving force. At its upper end, the filter casing 120 in FIG. 1 is shown extending vertically beyond the upper edges of the wall sections 160. This arrangement may be advantageous for accessing the cover 136 and interior of the filter casing 120 whereas the upper ends of the wall sections 160 may be at or near ground level with reference to the ground surface 104.

Figure 3:
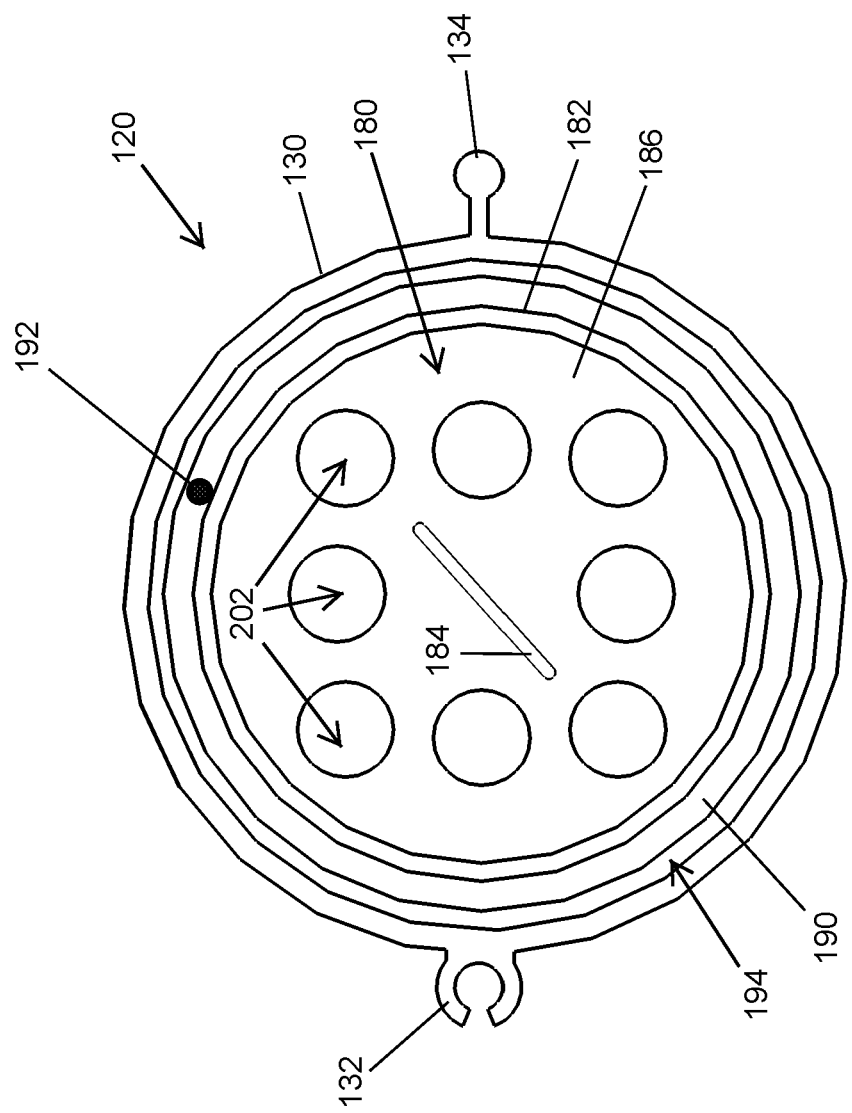
FIG. 3 is a downward view along the vertical length of the filter casing of FIG. 2.

FIG. 2 is a perspective view of the filter casing 120, showing the upper-end opening 138 without the cover 136 (FIG. 1). As shown in FIG. 2, the filter casing 120 has a first connector 132 and a second connector 134 extending parallel to each other along opposite lateral sides of the exterior of the structural wall 130. In the illustrated embodiment, the first connector 132 is shown as a channel and the second connector 134 is shown as a ridge with a widened lateral end (FIG. 3). Opposing lateral edges of the wall sections 160 have corresponding first and second connectors 162 and 164 to form male-female coupling connections 106 (FIG. 1) as the barrier wall 102 is constructed by sliding engagements of adjacent oppositely functioned connectors along the barrier wall 102.

FIG. 3 is a downward view along the vertical length of the filter casing 120 of FIG. 2, showing the interior of the filter casing 120 and the profiles of first and second connectors 132 and 134. In FIG. 3, a replaceable treatment cartridge 180 is shown as installed in the filter casing 120. The treatment cartridge 180 can be lowered into and raised from the interior of the filter casing 120 through the upper-end opening 138 (FIG. 2) when the cover 136 is removed and the treatment cartridge 180 is disengaged from the interior surface of the structural wall 130.

Figure 4:
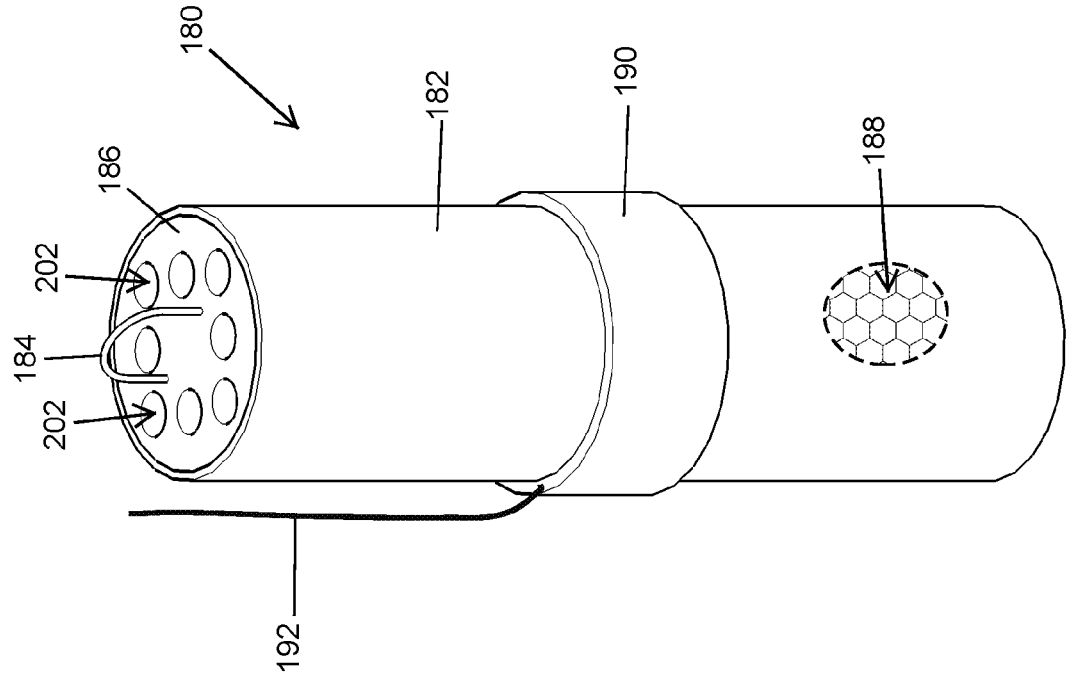
FIG. 4 is a perspective view of a treatment cartridge, according to at least one embodiment, removed from the filter casing of FIG. 3.

FIG. 4 is a perspective view of a treatment cartridge 180, according to at least one embodiment, removed from the filter casing 120 of FIG. 3. The treatment cartridge 180 includes a cartridge casing 182. In at least one embodiment, the cartridge casing 182 is shaped as a circular cylinder as shown in FIGS. 3 and 4. Other shapes are within the scope of these descriptions. For example, in other embodiments, cartridge casings of other treatment cartridges have hexagonal and rectangular outer profiles when viewed along their vertical lengths, for example corresponding to various embodiments of filter casings.

Figure 5:
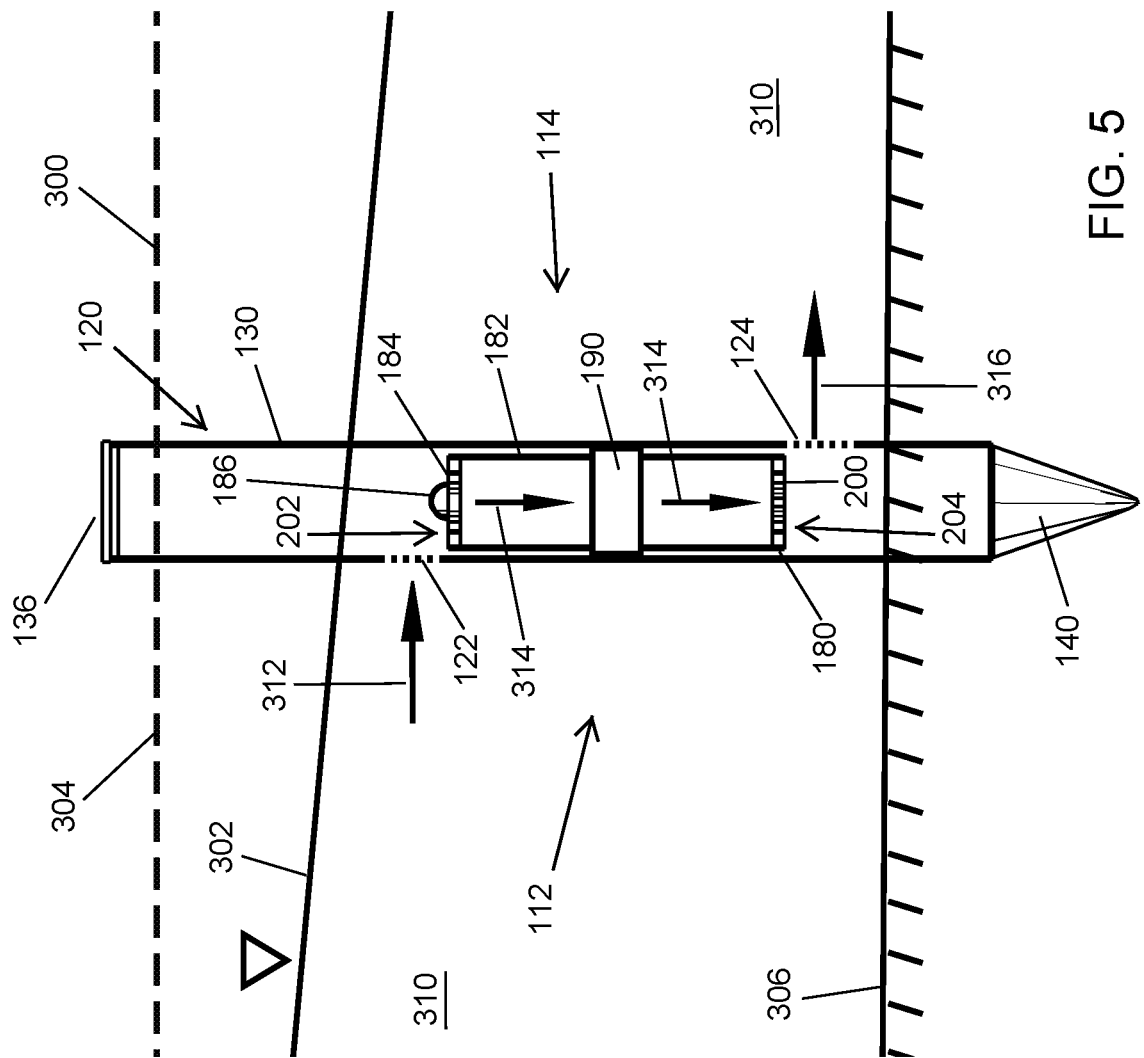
FIG. 5 is a side elevational view showing the filter casing of FIG. 1 in an installation ground area in which a water table line is shown below the ground surface.

As shown in FIGS. 3-4, at the upper end of the treatment cartridge 180, a lifting loop 184 or hook extends upward from a perforated cap 186, which is connected along its outer periphery to the cartridge casing 182. At the lower end of the treatment cartridge 180, a perforated bottom plate 200 (FIG. 5) is connected along its outer periphery to the cartridge casing 182. An inflatable seal 190 (FIG. 4) surrounds the filter casing 120 at an intermediary longitudinal position along the vertical length of the filter casing 120 between the upper and lower ends of the treatment cartridge 180. A fill tube 192 extends from the inflatable seal 190 for inflating and deflating the seal 190. As shown in FIGS. 3-4, upper openings 202 are formed through the perforated cap 186 of the treatment cartridge 180. Similarly, lower openings 204 are formed though the perforated bottom plate 200 (FIG. 5).

The cartridge casing 182 is undersized relative to the interior of the structural wall 130 of the filter casing 120, thus defining an annular space 194 (FIG. 3) between the cartridge casing 182 and structural wall 130 within the interior of the filter casing 120 as shown in FIG. 3, in which the inflatable seal 190 is shown in a deflated condition. In the illustrated embodiments, the outer diameter of the circularly cylindrical cartridge casing 182 is less than the inner diameter of the circularly cylindrical structural wall 130, thus defining an approximately circular annular space 194.

The inflatable seal 190 resides in the annular space 194. When the inflatable seal 190 is in a deflated condition (FIG. 3), the treatment cartridge 180 is disengaged from the interior surface of the structural wall 130 and can be lowered into and raised from the interior of the filter casing 120 through the upper-end opening 138 (FIG. 2). When the inflatable seal 190 is in an inflated condition as shown in (FIG. 5), it closes the annular space 194 (FIG. 3) at its longitudinal position by sealing against both the casing 182 of the treatment cartridge 180 and the interior surface of the structural wall 130. This engages and seals the treatment cartridge 180 with the interior surface of the structural wall 130.

Furthermore, with the inflatable seal 190 in an inflated condition, groundwater flow along the interior of the filter casing 120 is restricted to passing through the treatment cartridge 180. The upper openings 202 in the perforated cap 186 of the treatment cartridge 180 and lower openings 204 in the perforated bottom plate 200 permit groundwater to flow through the treatment cartridge 180. In one installation the upper openings 202 may serve as an inlet for downward flow along the interior of the treatment cartridge 180 as the lower openings 204 serve as an outlet. In another installation the lower openings 204 may serve as an inlet for upward flow along the interior of the treatment cartridge 180 as the upper openings 202 serve as an outlet. In at least one embodiment, the interior of the treatment cartridge 180 contains at least one PRM 188 that is designed to treat the liquid that passes therethrough. For just an example, and in no way limiting, multiple bags of different (or the same) PRMs could be compacted within a treatment cartridge 180. The selection of the PRM can be site or contaminant specific.

FIG. 5 is a side elevational view showing the filter casing 120 of FIG. 1 in an installation ground area 300. In each side elevation view referenced in these descriptions, both above ground and below ground portions of a remediation example is shown. In FIG. 5, a water table line 302 is shown below the ground surface 304. Earth above the water table line 302 is generally considered as unsaturated, whereas earth below the water table line 302 and above a lower-permeability earth layer 306 defines an aquifer 310 in which groundwater migration in the installation ground area 300 is generally directed to the right of the drawing by natural conditions or is caused by human intervention.

It is assumed in FIG. 5 that the barrier wall 102 is installed with the filter casing 120. The second side 114 of the barrier wall 102 (FIG. 1) faces the downgradient direction such that groundwater flow 312 (FIG. 5) from the upgradient direction enters the filter casing 120 through the upper screen 122, which serves as an inlet for downward flow 314 (FIG. 5) along the interior of the filter casing 120. In FIG. 5, the inflatable seal 190 is inflated and the downward flow 314 along the interior of the filter casing 120 is thereby restricted to passing through the treatment cartridge 180 and is thus treated by PRM contained therein. The upper openings 202 permit the downward flow 314 along the interior of the treatment cartridge 180 as the lower openings 204 permit the downward flow 314 to exit the treatment cartridge 180 toward the lower screen 124, which serves as an outlet from the filter casing 120 for treated groundwater flow 316 in the downgradient direction. FIG. 5 shows that the bottom assembly 140 is driven or otherwise installed in the lower-permeability earth layer 306 at the bottom of the aquifer 310.

Figure 6:
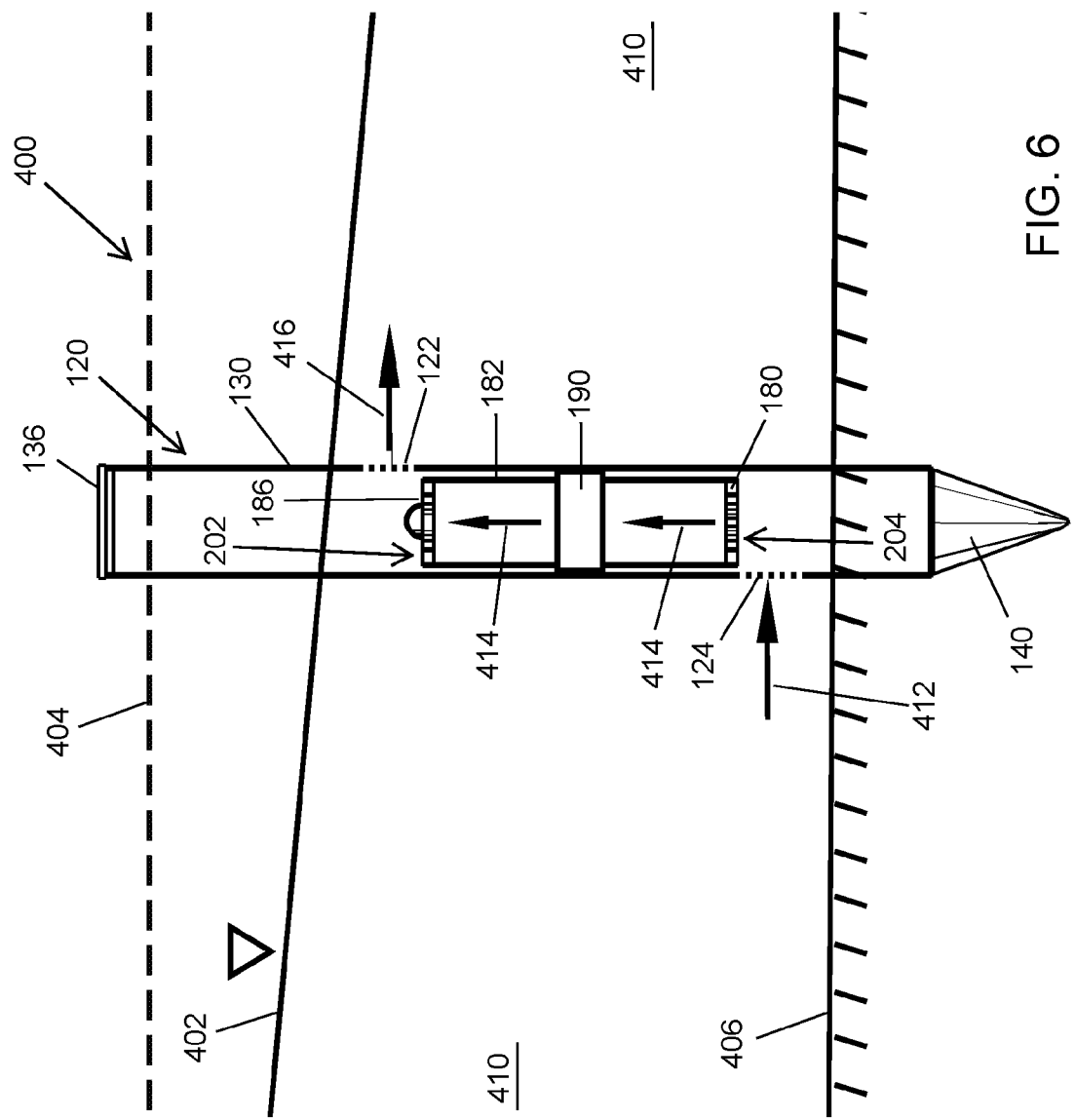
FIG. 6 is a side elevational view showing the filter casing of FIG. 1 in another installation ground area.

FIG. 6 is a side elevational view showing the filter casing 120 of FIG. 1 in an installation ground area 400. As in FIG. 5, a water table line 402 is shown in FIG. 6 below a ground surface 404, an aquifer 410 is defined below the water table line 402 and above a lower-permeability earth layer 406, and groundwater migration in the installation ground area 400 is generally directed to the right of the drawing by natural conditions or is caused by human intervention.

In FIG. 6, however, the lower screen 124 of the filter casing 120 faces the upgradient direction and the upper screen 122 faces the downgradient direction. Thus in FIG. 6, groundwater flow 412 from the upgradient direction enters the filter casing 120 through the lower screen 124, which serves as an inlet for upward flow 414 along the interior of the filter casing 120. The lower openings 204 permit the upward flow 414 along the interior of the treatment cartridge 180 as the upper openings 202 permit the upward flow 414 to exit the treatment cartridge 180 toward the upper screen 122, which serves as an outlet from the filter casing 120 for the treated groundwater flow 416 in the downgradient direction.

The flow in the two examples of FIGS. 5 and 6 are oppositely vertically directed within the filter casing 120, representing different remediation examples. Respective PRMs may be advantageously selected for placement in the treatment cartridge 180 in the respective examples of FIGS. 5 and 6. In either example, flow will progress in the rightward direction because of the higher hydraulic head on the upgradient side of a subsurface barrier wall installed with the filter casing 120.

In FIG. 5, the upper screen 122 serves as the inlet of the filter casing 120 by facing the upgradient direction, with reference to the water table line 302, whereas the lower screen 124 serves as the outlet of the filter casing 120. Thus, relatively shallow untreated groundwater flow 312 that enters the filter casing 120 is sampled relatively high in the aquifer 310, and the treated groundwater flow 316 is released at a greater depth. This may be advantageous for treating a ground area where contaminants tend to reside, drift, or float high in an aquifer, for example as do certain petroleum hydrocarbons and other light non-aqueous phase liquids (LNAPL). In such an example, a PRM particularly reactive to higher residing contaminants may be advantageously placed in the treatment cartridge 180.

In FIG. 6, the lower screen 124 serves as the inlet of the filter casing 120, whereas the upper screen 122 serves as the outlet of the filter casing 120. Thus, relatively deep untreated groundwater flow 412 that enters the filter casing 120 is sampled relatively deep in the aquifer 410, and the treated groundwater flow 416 is released at a lesser depth. This may be advantageous for treating a ground area where contaminants tend to reside, drift or sink low in an aquifer, for example non-aqueous phase liquids (DNAPL) such as trichloroethylene and other dense contaminants may be near the base of the aquifer. In FIG. 6, a PRM particularly reactive to lower residing contaminants may be advantageously placed in the treatment cartridge 180.

Figure 7:
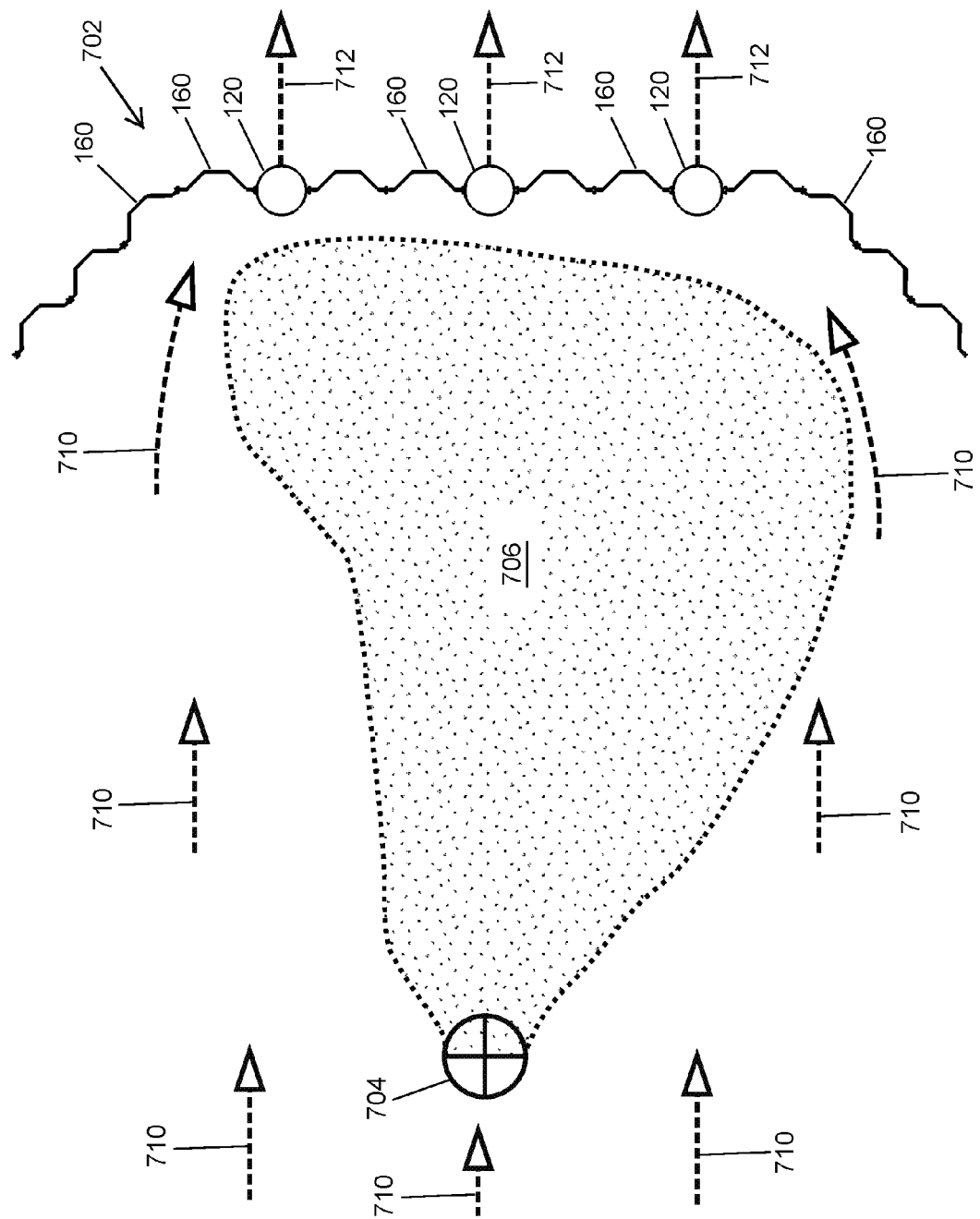
FIG. 7 is an overhead view of an area under remediation treatment according to at least one embodiment.

FIG. 7 is an overhead view of an area under remediation treatment according to at least one embodiment. Either or both examples of FIGS. 5 and 6 may be represented in FIG. 7, and other examples as well. In FIG. 7, a sectioned barrier wall 702 is shown as constructed of multiple interlocking wall sections 160 and several spaced filter casings 120. The barrier wall 702 is constructed to curve toward and partially surround a contamination source or location 704. A contamination plume 706 widens and drifts from the contamination source or location 704 with groundwater flow 710, which is generally directed to the right of the drawing by natural conditions or is caused by human intervention. The barrier wall 102 is formed to collect and funnel the drifting groundwater flow 710 and contamination plume 706 through the filter casings 120 along the wall. Treated groundwater flows 712 are shown as directed away from the barrier wall 702 in continued migration. Three filter casings 120 are expressly shown along the barrier wall 702 in FIG. 7, however, any number of filter casings 120 and wall sections 160 in any relative arrangement can be included in a barrier according to various embodiments. A barrier wall can be constructed with filter casings 120 in a center section and wall sections 160 along the edges. A barrier wall can be constructed with only filter casings 120, such as immediately near a contamination source or location 704.

Figure 8:
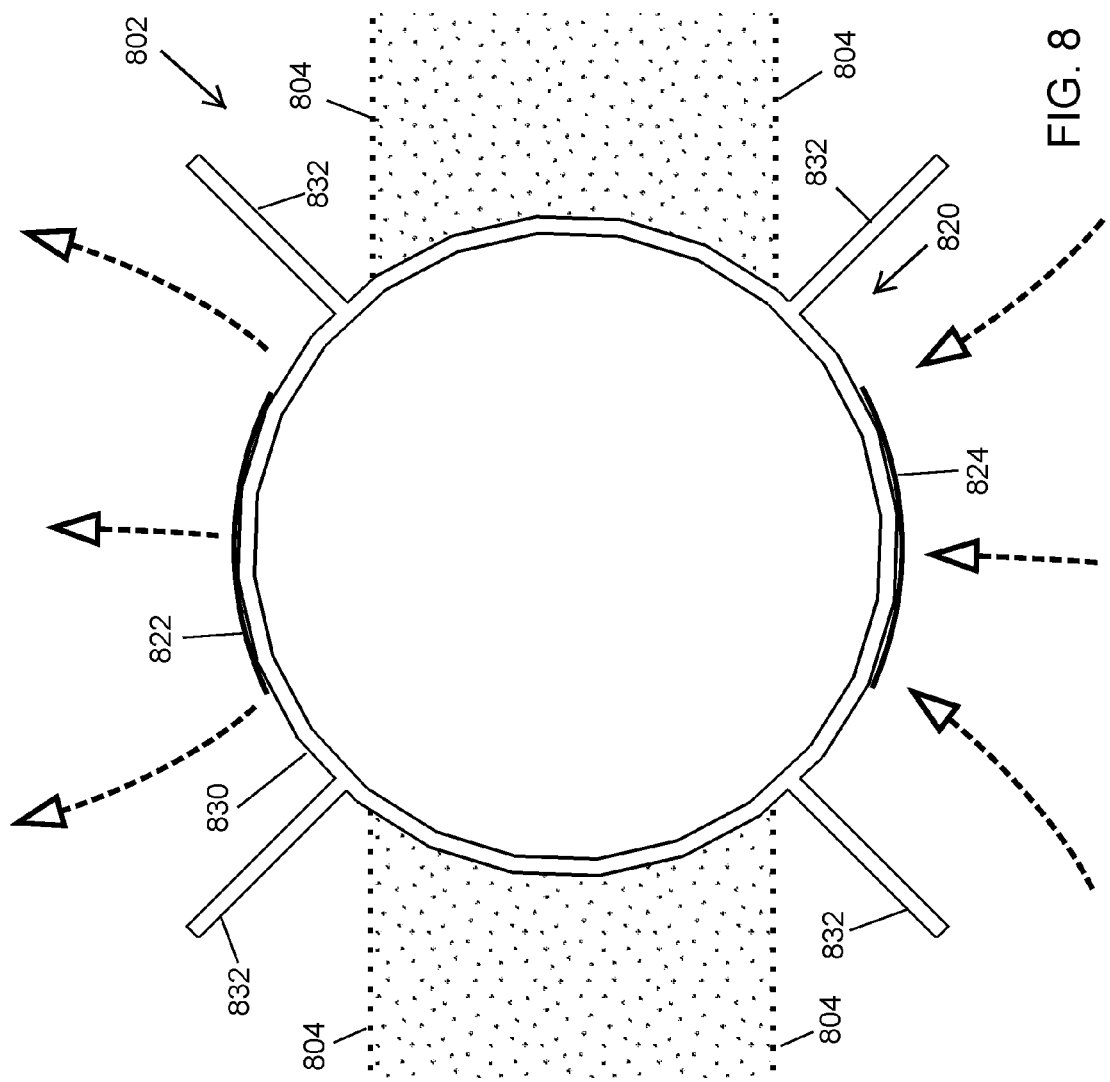
FIG. 8 is an overhead view of a filter casing, according to at least one other embodiment, installed in a wall of another example.

FIG. 8 is an overhead view of a filter casing 820, according to at least one other embodiment, installed with an adjacent barrier wall of another example. The filter casing 820 has many features similar to those of the filter casing 120 of FIGS. 1-7. For example, like the filter casing 120, the filter casing 820 has structural wall 830 through which screens 822 and 824 are formed permitting groundwater to pass between the interior and exterior of the filter casing 820 and neighboring ground areas. Either of the screens 822 can represent a lower screen and the other an upper screen. A treatment cartridge 180 as shown in FIG. 4 can be installed in the filter casing 820 of FIG. 8 when in use for treating contaminated groundwater.

Above descriptions relating to FIGS. 1-7 relate as well to FIG. 8 except where differences are described here. For example, fins 832 jut radially outward from the cylindrical structural wall 830, extending along the sides of the exterior of the structural wall 830. The filter casing 820 may be used, for example, as shown in an installation alternative to the barrier wall 102 of FIG. 1. In FIG. 8, the filter casing 820 is installed and subsequently connected to a barrier wall 802 constructed using a cementitious material, such as a slurry cement and clay, emplaced into a trench having boundary lines 804. For example, to construct the barrier wall 802, the filter casing 820 may be driven into the ground and a trench then dug to the filter casing. The fins 832 allow some tolerance for the trench to be dug using a large trenching machine. Other installation methods for constructing the barrier wall 802 can be used as well.

The fins 832 of FIG. 8 and the connectors 132 and 134 of FIG. 3 represent examples of engagement elements by which various embodiments of filter casings engage surrounding earth, constructions materials, or structural elements such as the wall sections 160 in barrier wall installations. Other examples are within the scope of these descriptions.

FIG. 9 is a side elevational view showing the filter casing 120 of FIG. 1 in an installation ground area 900 similar to that of FIG. 5. A water table line 902 is shown in FIG. 6 below a ground surface 904, an aquifer 910 is defined below the water table line 902 and above a lower-permeability earth layer 906, and groundwater migration in the installation ground area 900 is generally directed to the right of the drawing by natural conditions or is caused by human intervention. As in FIG. 5, untreated groundwater flows from the upgradient direction and enters the filter casing 120 through the upper screen 122, which serves as an inlet for downward flow along the interior of the filter casing 120. Within the filter casing 120, the groundwater passes through the treatment cartridge 180 toward the lower screen 124, which serves as an outlet from the filter casing 120 for the treated groundwater flow in the downgradient direction.

The filter casing 120 in FIG. 9 includes several sampling accesses. Above the treatment cartridge 180, a first sampling access 912 connected to a vertically extending first pipe or tube 914 can be accessed through a first port 916 near or above ground level to permit sampling and analysis of untreated groundwater. Below the treatment cartridge 180, a second sampling access 922 connected to a vertically extending second pipe or tube 924 can be accessed through a second port 926 near or above ground level to permit sampling and analysis of treated groundwater. A third sampling access 932 connected to a third pipe or tube 934 can be accessed through a third port 936 near or above ground level to permit sampling and analysis of gas that may accumulate or be present in the filter casing 120, for example above the water level within the filter casing 120 and below the cover 136.

Figure 10A:
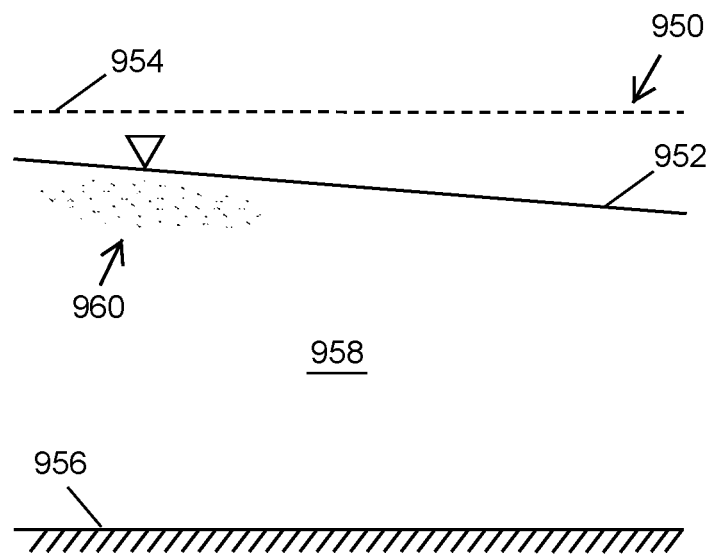
FIG. 10A is a side elevational view of a ground area in which contaminated groundwater is present such that remediation according to at least one embodiment is desired.

FIGS. 10A-10F pictorially represent a time-ordered sequence of events in which systems and methods for remediation of a site with contaminated groundwater are applied according to various embodiments described herein. In each, a ground area 950 has a water table line 952 below a ground surface 954. An aquifer 958 is defined below the water table line 952 and above a lower-permeability earth layer 956. Groundwater migration in the ground area 950 is generally directed in the downgradient direction to right in these drawings. In FIG. 10A, an untreated contamination a source or location is represented as a plume 960 below the water table line 952 in a relatively upstream location of the drawing with respect to the downgradient direction.

Figure 10B:
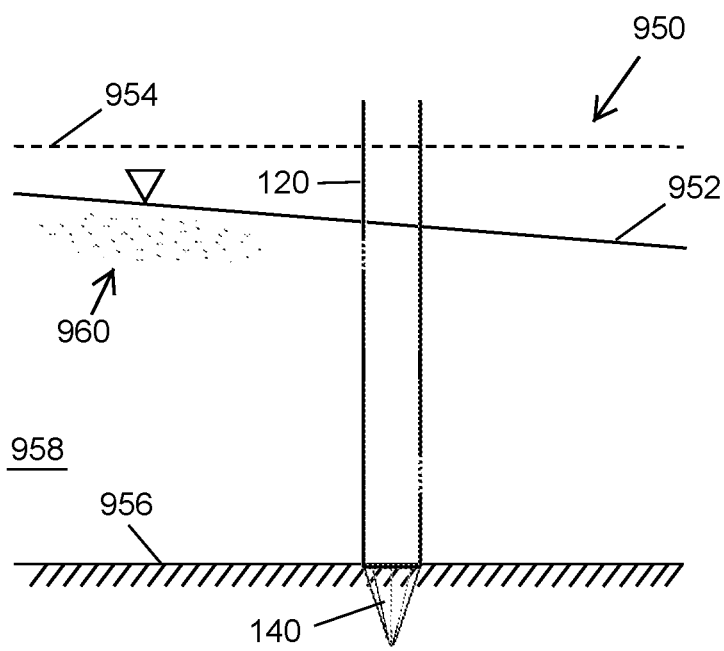
FIG. 10B is a side elevational view of the ground area of FIG. 10A, in which the filter casing of FIG. 1 is installed.
Figure 10C:
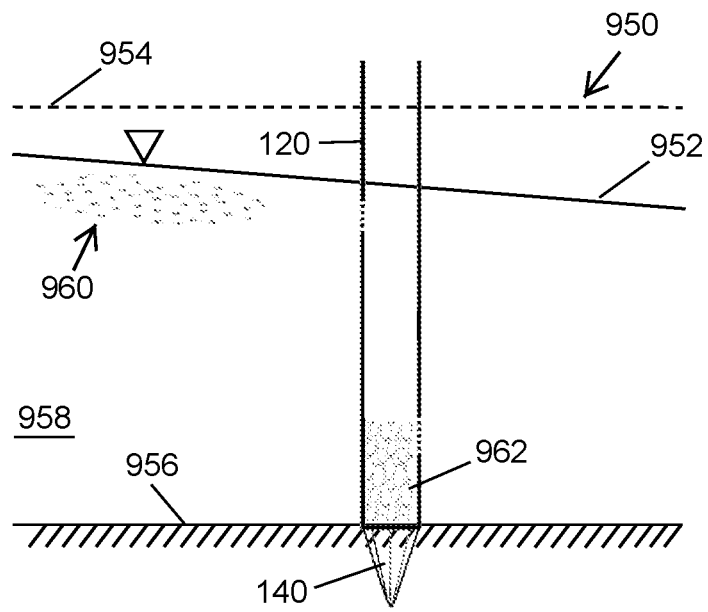
FIG. 10C is a side elevational view of the ground area and filter casing of FIG. 10B, in which a permeable spacer is installed in the bottom portion of the filter casing.

FIG. 10B is a side elevational view of the ground area 950 of FIG. 10A, in which the filter casing 120 of FIG. 1 is installed. It may be assumed in FIG. 10B that the barrier wall 102 of FIG. 1 or similar barrier according to various embodiments is installed with the filter casing 120. FIG. 10C is a side elevational view of the ground area 950 and filter casing 120 of FIG. 10B, in which a permeable spacer 962 is installed in the bottom portion of the filter casing 120 above the bottom assembly 140.

Figure 10D:
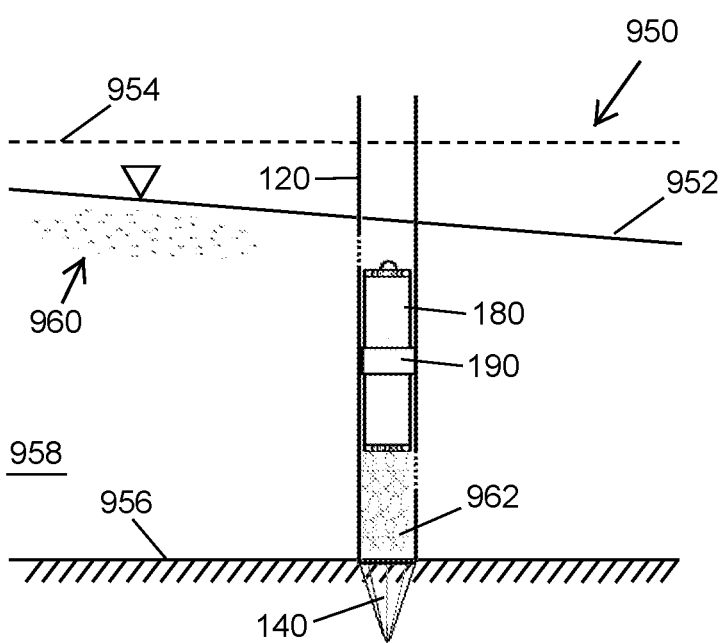
FIG. 10D is a side elevational view of the ground area and filter casing of FIG. 10B, in which a treatment cartridge is installed above the permeable spacer.

FIG. 10D is a side elevational view of the ground area 950 and filter casing 120 of FIG. 10B, in which a treatment cartridge 180 (FIG. 4) is installed above the permeable spacer 962. In placing the treatment cartridge 180, the inflatable seal 190 is in a deflated condition as the treatment cartridge 180 is lowered into the interior of the filter casing 120 onto the permeable spacer 952, which supports the treatment cartridge until the inflatable seal 190 is inflated to engage with the interior of the filter casing 120.

Figure 10E:
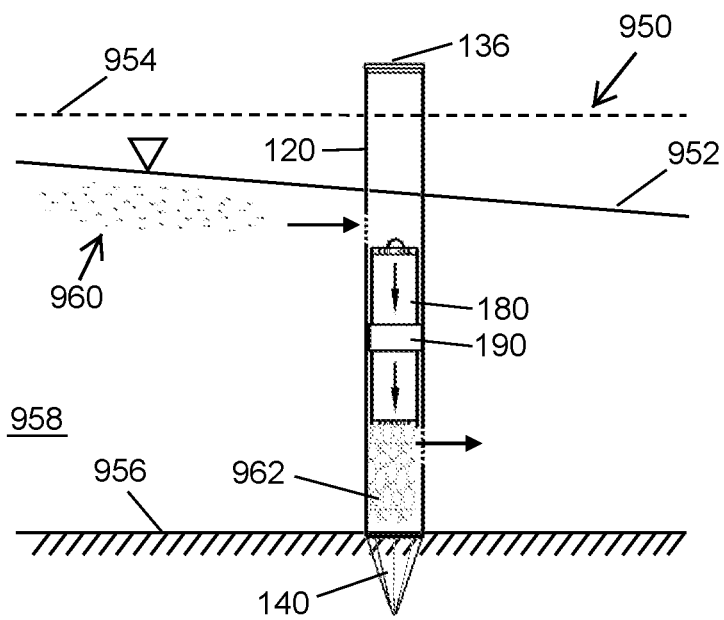
FIG. 10E is a side elevational view of the ground area and filter casing of FIG. 10D, in which the cover is installed upon the upper end of the filter casing, and remediation is underway as untreated groundwater flows into the filter casing and treated groundwater flows out.

FIG. 10E is a side elevational view of the ground area 950 and filter casing 120 of FIG. 10D, in which the cover 136 is installed upon the upper end of the filter casing 120, and remediation is underway. Untreated groundwater 972 enters the filter casing 120 through the upper screen 122, which serves as an inlet for downward flow 974 along the interior of the filter casing 120 and thus through the treatment cartridge 180 for treatment by at least one PRM contained in the treatment cartridge 180. Treated groundwater flow 976 exits the lower screen 124 in the downgradient direction. As remediation in FIG. 10E progresses, PRM contained in the treatment cartridge 180 is being exhausted as to its reactive effect on the flow 974 along the interior of the filter casing 120. During this stage of remediation, sampling and analysis of untreated groundwater, treated groundwater, and gas within the filter casing 120 may be conducted, for example as described with reference to FIG. 9.

Figure 10F:
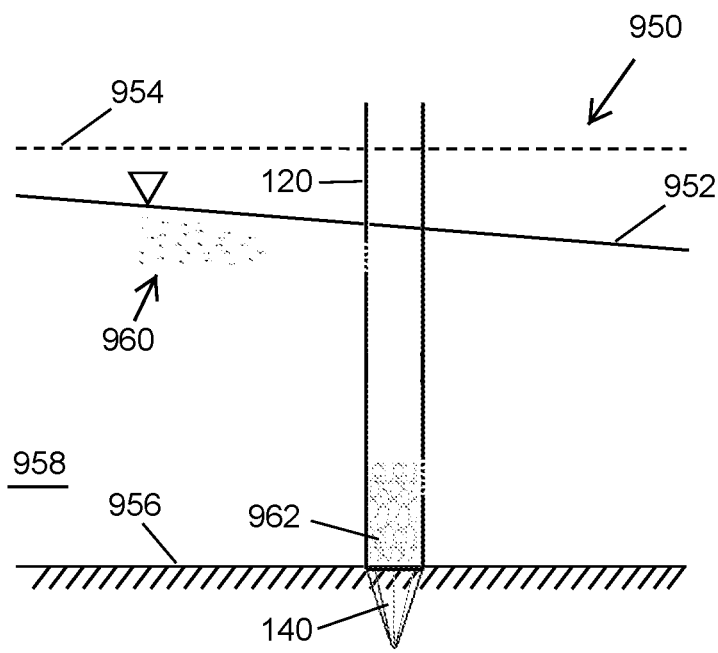
FIG. 10F is a side elevational view of the ground area and filter casing of FIG. 10E, in which the treatment cartridge is removed for replacement or replenishment of the treatment PRM contained.

FIG. 10F is a side elevational view of the ground area 950 and filter casing 120 of FIG. 10E, in which the treatment cartridge 180 is removed for replacement or replenishment of the treatment PRM contained. Depending on the example, the treatment cartridge 180 may need to be disposed of or handled as hazardous waste. In removing the treatment cartridge 180, the inflatable seal 190 is in a deflated condition as the treatment cartridge 180 is raised from the interior of the filter casing 120. The plume 960 representing contamination in the ground area 950 is shown as lessened in FIG. 10F relative to FIG. 10A to represent the beneficial effect of the remediation process. Further progress can continue with any number of cycles of the process from FIG. 10D to FIG. 10F.

Remedial systems, devices, and methods described above can be placed close to contamination source areas for aggressive mass reduction using replaceable PRMs with shorter effective life, as well as in tandem with downgradient PRBs for property-boundary mass flux control. In addition, multiple arrays of PRMs can be arranged to treat multiple, site specific, and mixed groundwater contaminants. Although the system can be placed in conventional excavations, the ability to drive or install filter casings and treatment cartridges in unconsolidated materials can reduce waste volumes and substantially lower hazardous waste disposal costs. The screens of the flow-through filter casings can be cleaned using conventional well-drilling techniques, extending the system's longevity. Thus remediation according to embodiments described herein and variants coming to mind in view of these embodiments are rendered less complicated and involve fewer uncertainties and more versatility. Cost-effective monitoring is provided for groundwater quality upgradient, downgradient, and within the filter casings so as to permit assessments at each stage of remediation and of the overall performance of the remedial system.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A liquid treatment system comprising:
   a filter channel that defines an enclosure, the enclosure defining a first screen and a second screen,
   wherein the first screen and second screen face in opposing directions, the first screen being defined on the filter channel at a different vertical elevation relative to the second screen and facing an upgradient direction of an aquifer flow, the second screen facing a downgradient direction of the aquifer flow;
   a liquid treatment cartridge configured for placement in the enclosure of the filter channel between the first screen and the second screen in a space defined vertically between the first screen and the second screen, the liquid treatment cartridge having an upper end below the first screen and a lower end above the second screen, the cartridge defining a permeable treatment material therein for treating contaminated groundwater,
   wherein the upper end defines a sampling port passageway and the lower end defines a corresponding sampling port passageway to allow a vertically extending sampling pipe or tube to extend below the lower end to sample fluids passing through the liquid treatment cartridge; and
   a seal surrounding the cartridge at an intermediary position along the cartridge between the upper end and lower end and sealing the liquid treatment cartridge relative to the filter channel between the first screen and the second screen when the cartridge is sealed within the enclosure, the seal selectively engageable between the cartridge and the filter channel to direct fluid vertically through the cartridge for treatment after passing through the first screen, through the cartridge, and through the second screen, the seal further configured to allow selective removal of the cartridge when the seal is selectively disengaged relative to the channel,
   wherein the filter channel is positioned proximal to and configured to functionally engage a barrier wall, the barrier wall defining a first panel extending from about a first portion of the filter channel and a second panel extending from about a second portion of the filter channel, a portion of the barrier wall being below grade of a ground surface, the first and second panels of the barrier wall dividing the filter channel into the upgradient direction and the downgradient direction, wherein the filter channel is oriented such that the first screen faces the upgradient direction,
   wherein the first screen is positioned below a water level in the upgradient direction of the aquifer,
   wherein, the second screen faces the downgradient direction and does not extend to the upgradient direction of the filter channel that is bound by the barrier wall.

2. The liquid treatment system of claim 1, wherein, when the liquid treatment cartridge is placed in the filter channel, an annular space is defined between an exterior of the cartridge and an interior of the enclosure of the filter channel.

3. The liquid treatment system of claim 2, wherein the seal has an expanded condition in which an annular space is filled by the seal such that the liquid treatment cartridge is engaged with the interior of the enclosure of the filter channel.

4. The liquid treatment system of claim 3, wherein the seal has a retracted condition in which the liquid treatment cartridge is disengaged from the interior of the enclosure of the filter channel permitting the liquid treatment cartridge to be placed within and removed from the enclosure of the filter channel.

5. The liquid treatment system of claim 1, further comprising engagement elements connected to an exterior of the enclosure of the filter channel.

6. The liquid treatment system of claim 5, wherein the engagement elements comprise a first connector comprising a channel and a second connector comprising a ridge with a widened end.

7. The liquid treatment system of claim 5, wherein the engagement elements comprise fins jutting radially outward from the enclosure.

8. The liquid treatment system of claim 1, further including another liquid treatment cartridge having a permeable treatment material therein that is placed in the filter channel vertically displaced from the treatment cartridge.

9. A liquid treatment system comprising:
   a barrier wall, the barrier wall have a portion for being positioned below grade of a ground surface;
   a filter channel that defines an enclosure, the enclosure defining a first screen and a second screen,
   wherein the first screen and second screen face in opposing directions, the first screen being defined on the filter channel at a different vertical elevation relative to the second screen and facing an upgradient direction of an aquifer flow, the second screen facing a downgradient direction of the aquifer flow;
   a liquid treatment cartridge configured for placement in the enclosure of the filter channel between the first screen and the second screen in a space defined vertically between the first screen and the second screen, the cartridge having an upper end below the first screen and a lower end above the second screen, the cartridge defining a permeable treatment material therein for treating contaminated groundwater, wherein the upper end defines a sampling port passageway and the lower end defines a corresponding sampling port passageway to allow a vertically extending sampling pipe or tube to extend below the lower end to sample fluids passing through the liquid treatment cartridge; and a seal surrounding the cartridge at an intermediary position along the cartridge between the upper end and lower end and sealing the liquid treatment cartridge relative to the filter channel between the first screen and the second screen when the cartridge is sealed within the enclosure, the seal selectively engageable between the cartridge and the filter channel to direct fluid vertically through the cartridge for treatment after passing through the first screen, through the cartridge, and through the second screen, the seal further configured and to allow selective removal of the cartridge when the seal is selectively disengaged relative to the channel, wherein the filter channel is positioned proximal to the barrier wall, the barrier wall defining a first panel extending from about one portion of the filter channel and a second panel extending from about a second portion of the filter channel, a portion of the barrier wall being below grade of the ground surface, wherein the filter channel is oriented such that the first screen faces the upgradient direction, wherein the first screen is positioned below a water level in the upgradient direction in the aquifer, wherein, the second screen faces the downgradient direction and does not extend to an upgradient direction of the filter channel that is bound by the barrier wall.

10. The liquid treatment system of claim 9, wherein, when the liquid treatment cartridge is placed in the filter channel, an annular space is defined between an exterior of the cartridge and an interior of the enclosure of the filter channel.

11. The liquid treatment system of claim 10, wherein the seal has an expanded condition in which an annular space is filled by the seal such that the liquid treatment cartridge is engaged with the interior of the enclosure of the filter channel.

12. The liquid treatment system of claim 11, wherein the seal has a retracted condition in which the liquid treatment cartridge is disengaged from the interior of the enclosure of the filter channel permitting the liquid treatment cartridge to be placed within and removed from the enclosure of the filter channel.

13. The liquid treatment system of claim 9, further comprising engagement elements connected to an exterior of the enclosure of the filter channel.

14. The liquid treatment system of claim 13, wherein the engagement elements comprise a first connector comprising a channel and a second connector comprising a ridge with a widened end.

15. The liquid treatment system of claim 13, wherein the engagement elements comprise fins jutting radially outward from the enclosure.

16. The liquid treatment system of claim 9, further including another liquid treatment cartridge having a permeable treatment material therein that is placed in the filter channel vertically displaced from the treatment cartridge.

17. A liquid treatment system comprising:

a filter channel that defines an enclosure;

a barrier wall defining a first panel extending from about one portion of the filter channel and a second panel extending from about a second portion of the filter channel, a portion of the barrier wall being below grade of a ground surface, the barrier wall dividing the filter channel into an upgradient direction and a downgradient direction of an aquifer;

wherein the enclosure further defines a first opening and a second opening, wherein the first opening is defined on the filter channel at a different vertical elevation relative to the second opening;

a liquid treatment cartridge configured for placement in the enclosure of the filter channel between the first opening and the second opening, the cartridge defining a permeable treatment material therein for treating contaminated groundwater, wherein the upper end defines a sampling port passageway and the lower end defines a corresponding sampling port passageway to allow a vertically extending sampling pipe or tube to extend below the lower end to sample fluids passing through the liquid treatment cartridge; and a seal surrounding the cartridge and sealing the liquid treatment cartridge relative to the filter channel between the first opening and the second opening when the cartridge is sealed within the enclosure, the seal selectively engageable between the cartridge and the filter channel, wherein, the first opening is positioned below a water level in the upgradient direction in the aquifer, wherein, the second opening faces the downgradient direction and does not extend to the upgradient direction of the filter channel that is bound by the barrier wall, wherein, a cap is engaged with a top of the filter channel, wherein, a gap is defined between a bottom facing surface of the cap and a top facing surface of the cartridge, wherein, a tapered drive shoe is defined at a bottom portion of the filter channel for driving the filter channel below grade of the ground surface.

* * * * *